United States Patent Office 3,491,057
Patented Jan. 20, 1970

3,491,057
SATURATED POLYESTERS STABILIZED WITH NITROGEN-CONTAINING COMPOUNDS
Tadao Kato, Masana Yanagi, and Yoshimitsu Ichikawa, Mishima-shi, Masayuki Ohosugi, Sunto-gun, Shizuoka-ken, Masao Hijiri, Mishima-shi, and Tadao Tsutsumi and Muneyoshi Minami, Ohtsu-shi, Japan, assignors to Toyo Rayon Kabushiki Kaisha, Tokyo, Japan, a corporation of Japan
No Drawing. Filed June 28, 1967, Ser. No. 649,455
Claims priority, application Japan, Sept. 24, 1966, 41/62,696; Apr. 5, 1967, 42/21,375
Int. Cl. C08g 51/60
U.S. Cl. 260—45.8                                  10 Claims

ABSTRACT OF THE DISCLOSURE

A stabilized polyester composition comprising a polyester selected from the group consisting of polyethylene terephthalate and modified polyesters comprising predominantly of ethylene terephthalate units, and 0.001 to 5 percent by weight, based on said polyester, of a specific nitrogen-containing compound.

---

This invention relates to polyester compositions having fiber or film-forming properties, which excel in resistance to oxidation and thermal resistance to dry as well as wet heat.

Polyethylene terephthalate or the copolyesters which consist predominantly of ethylene terephthalate units and contain as a third component such as isophthalalic acid, hexahydroterephthalic acid, adipic acid, propylene glycol, or 1,4-cyclohexane dimethanol not only possess a high softening point and tenacity but also excellent molecular orientation as well as other desirable properties. Hence, they are being widely manufactured commercially as fibers and films. It is however known that the polymeric chain of polyethylene terephthalate or the modified polyesters which consist predominantly of ethylene terephthalate units, upon being exposed to elevated temperatures of 180–250° C. in air, are susceptible to oxidative and thermal decomposition, with the consequence that these polyesters either become brittle or their degree of polymerization declines. Hence, they could not be used for fibers and films which were heat treated at elevated temperatures or in those cases where they would be exposed to elevated temperature in air. For example, the effects of the foregoing thermal degradation was exceedingly great in the case where these polyester fibers were used for such as the bag filter of cement and the canvas for paper making.

It has been known in the past to incorporate various stabilizers in polyethylene terephthalate or the predominantly polyethylene terephthalate modified polyesters for enhancing their resistance to oxidation and resistance to dry as well as wet heat.

For example, as these stabilizers for polyesters, the following are known. As those which are generally used for improving the heat resistance, included are such as the phenolic compounds (U.S.P. 2,945,000), the amines (U.S.P. 2,996,477), the quaternary ammonium compounds (U.S.P. 3,039,998), the carbodimide compounds (French Patent 1,310,138), the phosphorus compounds (British Patents 769,220, 770,531, 791,283, Japanese Patent Publication 15435/1964), the guanidine compounds (Belgian Patent 614,017) and the beta-resorcinic acid derivatives (Japanese Patent Publication 629/1963). On the other hand, those for enhancing the resistance to wet heat include carbodimide and the silicon-containing compounds (Japanese Patent Publication 4730/1964, French Patents 1,308,502 and 1,310,138, British Patent 854,134 and German Patent 1,005,726).

The polyester fibers containing these known stabilizers are however as yet not fully satisfactory as to their heat resistance. Further, even if these known stabilizers could impart one of either the dry heat resistance or the wet heat resistance to the polyester fiber, it was not possible to impart both of these properties thereto.

It is an object of this invention to provide polyester compositions which not only possess the desirable combination of excellent resistance to oxidation as well as excellent resistance to dry and wet heat at elevated temperatures, but also possess stabilized fiber and film-forming properties at elevated temperatures.

The foregoing object is achieved by a thermally stable polyester composition comprising a polyester selected from the group consisting of polyethylene terephthalate and modified polyesters which consist predominantly of ethylene terephthalate units, and 0.001 to 5% by weight based on said polyester of a nitrogen-containing compound to be hereinafter fully described.

The polyesters which can be used in this invention are either polyethylene terephthalate or the modified polyesters consisting predominantly of ethylene terephthalate units. It is preferred that these polyesters have a molecular weight sufficient for forming fibers or films, and particularly a number average molecular weight of 8000 to 40,000. As the modified polyester consisting predominantly of ethylene terephthalate units, included are the copolymeric polyesters which contain at least 60% of the ethylene terephthalate units and not more than 40% of the other copolymeric components, and the blends of polyesters comprising polyethylene terephthalate or the foregoing copolymeric polyesters and the other polymers in such a proportion that the content of the ethylene terephthalate units become at least 60% of the whole.

As the copolymeric component of the copolymeric polyester, mention can be made of the aliphatic dicarboxylic acids such as oxalic, adipic, azelaic, sebacic and hexahydroterephthalic acids; the aromatic dicarboxylic acids such as isophthalic, phthalic, 2,6-naphthalenedicarboxylic and diphenic acids; the alicyclic dicarboxylic acids such as 1,2-cyclobutanedicarboxylic acid and 1,4-cyclohexanedicarboxylic acid; and besides these, the dicarboxylic acids containing elements other than carbon, hydrogen and oxygen, for example, the iodine or nitrogen atom, for instance, the compounds of the formulas

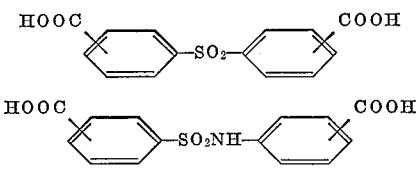

such as 5-sodium sulfoisophthalic acid and 5-methyl sulfoisophthalic acid; and the polybasic acid such as the polyfunctional compounds as trimellitic acid and pyromellitic acid. However, the copolymeric components are not limited to these hereinabove mentioned. On the other hand, the glycolic components which can be copolymerized include, such, for example, as diethylene glycol, propylene glycol, polyethylene glycol, butane diol, thioglycol, p-xylene glycol, 1,4-cyclohexane methanol, 2,2-bis(p-2-oxyphenyl) propane, 2,2-bis(p-oxyethoxyphenyl) propane and the other polyoxy compounds such as glycerine and pentaerythritol. On the other hand, as the oxycarboxylic acids which can be copolymerized, included are such as p-oxyethoxybenzoic acid, vanillic acid, p-oxyethoxy-m-chlorobenzoic acid, p-oxymethylbenzoic acid and glycolic acid. Needless to say, the glycolic component or the oxycarboxylic acid is not limited to those hereinabove mentioned.

The invention can also be applied to the polymer blends consisting of either polyethylene terephthalate or a copolyester containing at least 60% of ethylene terephthalate units and other polymers, for example, linear polyamides such as polycaprolactam and polyhexamethylene adipamide; polyolefins such as polyethylene, polypropylene, polybutene-1 and polystyrene; other polyesters such as polyethylene adipate (ethylene glycol and adipic acid), polyethylene isophthalate (ethylene glycol and isophthalic acid), poly-p-ethylene oxybenzoate (p-oxyethoxybenzoic acid); and polyethers such as polyethylene glycol, polypropylene glycol and polytetrahydrofuran.

The nitrogen-containing compounds which are usable in this invention are represented by one of the following formulas:

(I) 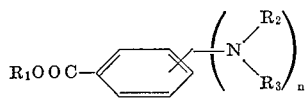

wherein $R_1$ is a member selected from the group consisting of hydrogen, hydrocarbon groups of 1–10 carbon atoms, preferably lower alkyl, and hydroxy lower alkyl, $R_2$ and $R_3$ are respectively members selected from the group consisting of hydrogen, hydrocarbon groups of 1–10 carbon atoms, preferably e.g. lower alkyl, phenyl, and benzyl, and $n$ is an integer from 1 to 2;

(II) 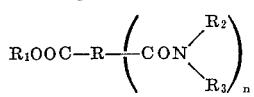

wherein $R_1$, $R_2$, $R_3$ and $n$ have the meanings hereinbefore defined, and R is a di- or trivalent hydrocarbon group of 1–10 carbon atoms, preferably lower alkyl and phenyl;

(III) 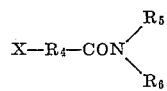

wherein $R_4$ is a divalent hydrocarbon group of 1–10 carbon atoms, preferably phenylene, lower alkylene, lower alkenylene and benzilene, $R_5$ and $R_6$ are respectively members selected from the group consisting of hydrogen, hydrocarbon groups of 1–10 carbon atoms, preferably lower alkyl and phenyl, and lower alkoxyaryl, and X is a member selected from the group consisting of hydrogen, hydroxyl and group $$-COON\begin{matrix}R_5\\R_6\end{matrix}$$

(IV) 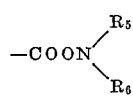

wherein $R_7$ is either a saturated or unsaturated alkylene group, or 1,2-phenylene or 1,8-naphthalene groups, whose nucleus may be substituted, $R_8$ is a member selected from the group consisting of hydrogen and hydrocarbon groups 1–20 carbon atoms, preferably lower alkyl, phenyl and benzyl, which may have a substituent such as carboxyl, hydroxyl, alkoxycarbonyl and hydroxyalkoxycarbonyl, and an acyl group, preferably an aliphatic acyl, and $n$ is either 1 or 2, with the proviso that when $R_7$ is the aforesaid alkylene chain the two carbonyl groups are attached to different carbon atoms of the alkylene group and when $n$ is 2, $R_8$ is a divalent hydrocarbon group;

(V) 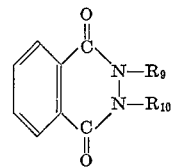

wherein $R_9$ and $R_{10}$ are respectively members selected from the group consisting of hydrogen, phenyl and lower alkyl groups;

(VI) 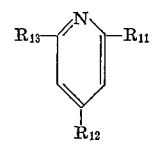

wherein $R_{11}$, $R_{12}$ and $R_{13}$ are respectively members selected from the group consisting of hydrogen and hydrocarbon groups of 1–10 carbon atoms, preferably lower alkyl, styryl and benzyl, with the proviso that at least two of the groups are hydrocarbon;

(VII) 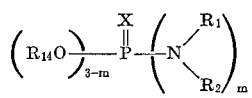

wherein $R_1$ and $R_2$ have the meanings hereinbefore defined, X is a member selected from the group consisting of oxygen and sulfur, $R_{14}$ is a member selected from the group consisting of hydrogen and hydrocarbon groups of 1–10 carbon atoms, preferably lower alkyl and phenyl, and $m$ is an integer from 1 to 3;

(VIII) 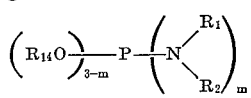

wherein $R_1$, $R_2$, $R_{14}$ and $m$ have the meanings hereinbefore defined; or (IX) 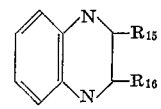

wherein $R_{15}$ and $R_{16}$ are either respectively a member selected from the group consisting of hydrogen, hydroxy, carboxyl and halogens, or $R_{15}$ and $R_{16}$ being linked to form the group

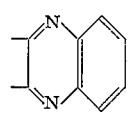

As compounds represented by these general formulas, specifically the following can be mentioned.

As compounds of Formula I included are such as p - aminobenzoic acid, methyl p - aminobenzoate, p - aminobenzoic acid beta - hydroxyethylester, p - (N - methylamino)benzoic acid, methyl p - (N - methylamino) benzoate, p - (N,N - dimethylamino)benzoic acid, methyl p - (N,N - dimethylamino)benzoate, anthranilic acid, methylanthranilate, N - methylanthranilic acid, methyl N-methylanthranilate, N,N-dimethylanthranilic acid, methyl N,N - dimethylanthranilate, methyl 3,5 - diaminobenzoate, methyl 3,5 - di(N,N - dimethylamino)benzoate, 3,5 - (N,N,N',N' - tetramethylamino)benzoic acid, methyl 3,5-di(N,N,N',N' - tetramethylamino)benzoate, 2,4,6 - tri - aminobenzoic acid, p - (N - methyl, N - ethylamino)benzoic acid and methyl p - (N - methyl, N - ethylamino)-benzoate.

As compounds of Formula II, included are those having the following structural formulas:

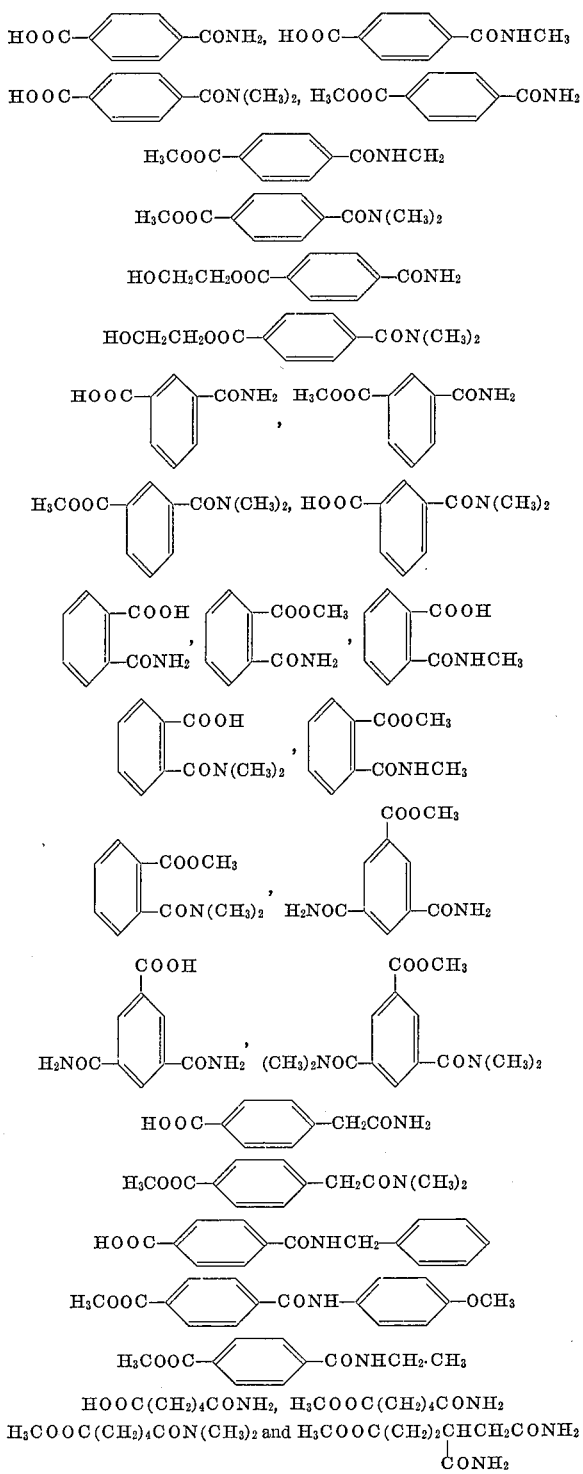

HOOC(CH₂)₄CONH₂, H₃COOC(CH₂)₄CONH₂
H₃COOC(CH₂)₄CON(CH₃)₂ and H₃COOC(CH₂)₂CHCH₂CONH₂
$\qquad\qquad\qquad\qquad\qquad\qquad\qquad\qquad$ |
$\qquad\qquad\qquad\qquad\qquad\qquad\qquad\qquad$ CONH₂

As compounds of Formula III can be mentioned such as: malonic acid diamide, glycolic acid amide, adipic acid diamide, fumaric acid diamide, phthalic acid diamide, terephthalic acid diamide, benzamide, benzylamide, cyclohexanecarboxylic acid amide, malonic acid dimethylamide, malonic acid diphenylamide and phthalic acid dimethylamide.

When the $R_7$ in the compounds of Formula IV either 1,2 - phenylene or 1,8 - naphthylene in which the nucleus may be substituted, the substituent group may be either lower alkyl, halogen, carboxyl, alkoxycarbonyl or hydroxyalkoxycarbonyl.

The compounds of Formula IV are exemplified by the following:

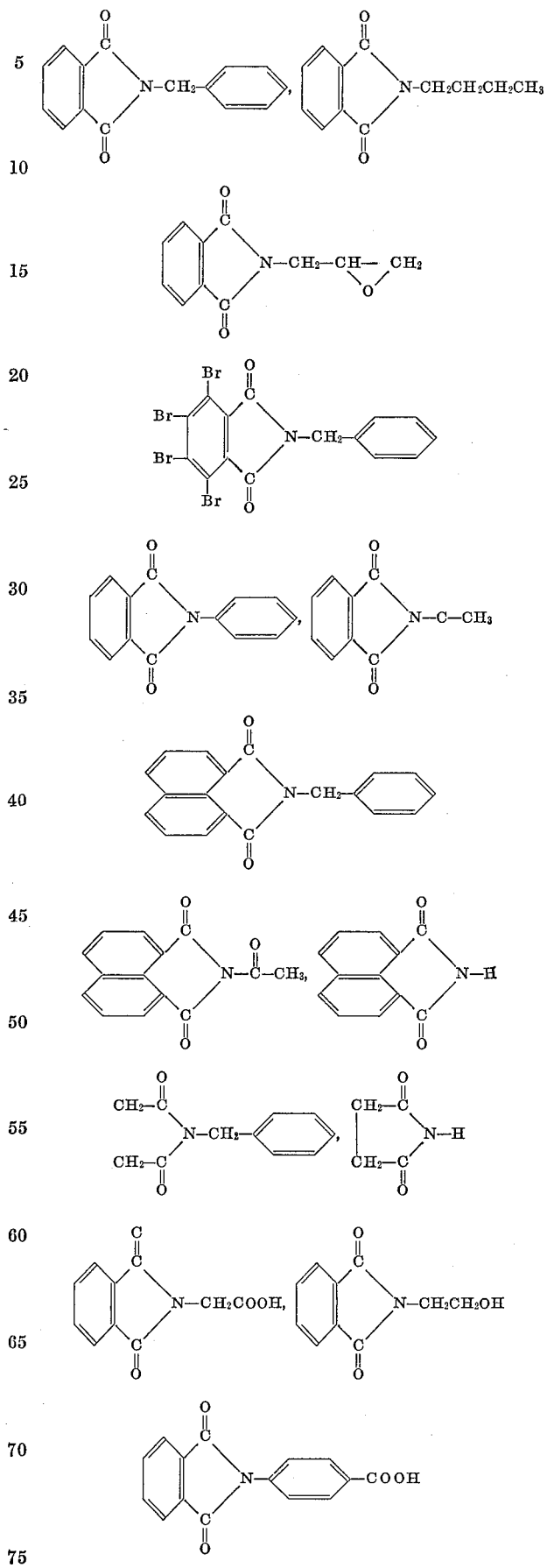

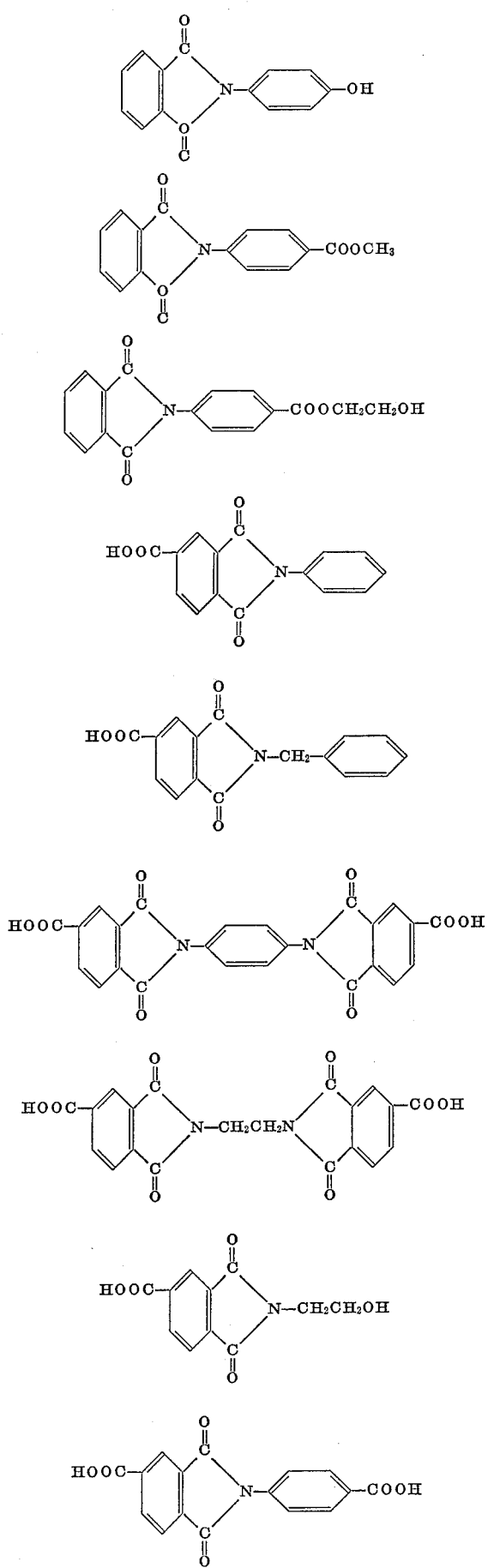

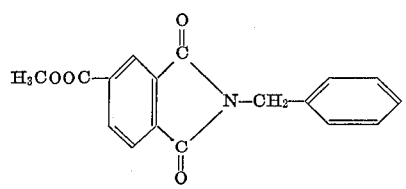

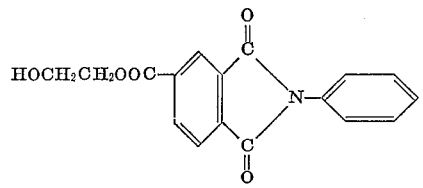

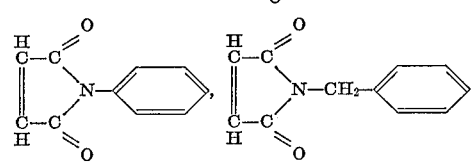

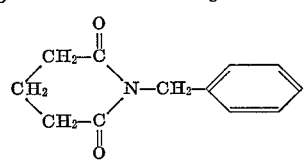

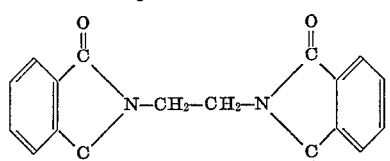

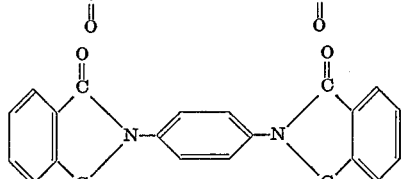

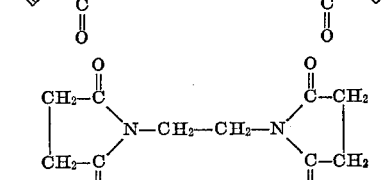

and polymer having repeating unit of the formula

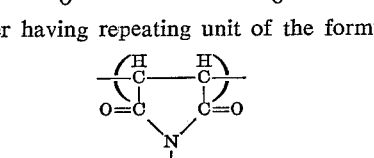

As compounds of Formula V, included are phthalhydrazide, N,N' - dimethylphthalhydrazide, N,N' - dibutylphthalhydrazide and N-phenylphthalhydrazide.

As the compounds of Formula VI, there can be mentioned such compounds as 2,4-distylpyridine, 2,6-distylpyridine, 2,4,6-tristylpyridine, 2-styryl-4-ethylpyridine and 2-benzyl-6-ethylpyridine.

As compounds of Formula VII included are the following:

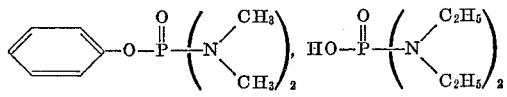

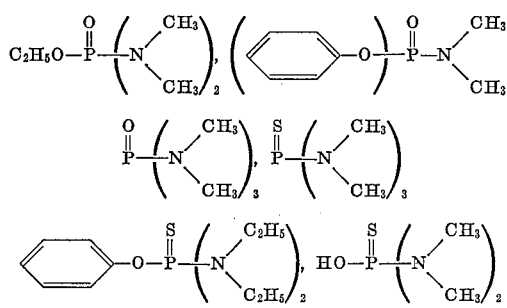

and

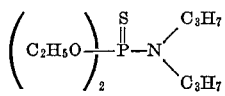

As compounds of Formula VIII, included are the following:

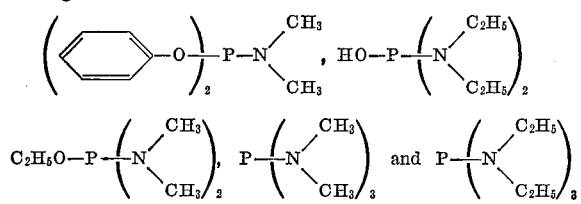

As compounds of Formula IX, included are 2,3-dihydroxyquinoxaline, 2,3-dichloroquinoxaline, quinoxaline 2,3-dicarboxylic acid, ethyl quinoxaline 2,3-dicarboxylate, quinoxaline 2,3-dicarboxylic acid anhydride, quinoxaloquinoxaline, 2-hydroxyquinoxaline, 2-bromoquinoxaline, and 2,3-dihydroxy N,N′-dimethylquinoxaline.

Of the foregoing nitrogen-containing compounds, the compounds most preferably used in this invention are the phthalimides of Formula IV. The phthalimides not only can impart to the polyesters excellent resistance to dry as well as wet heat but there is also no tendency at all of the polyester shaped articles being discolored by these compounds. Other nitrogen-containing compounds which are desirably used in this invention for imparting dry and vapor heat resistance to polyesters are the compounds of the aforesaid Formulas III, I and II, in the order given.

The nitrogen-containing compounds illustrated hereinbefore can be used either alone or in combinations of two or more thereof. While the amount used of these nitrogen-containing compounds will vary considerably depending upon the class of the compound, generally speaking, they are incorporated in an amount of 0.001% to 5% by weight, and preferably 0.005% to 1% by weight, based on the polyester.

These nitrogen-containing compounds can be added to the polyester during any stage prior to the molding of the polyester. For instance, they can be added either to the starting material before the preparation of the polyester or during an intermediate step during the preparation of the polyester. Alternatively, they can be kneaded and mixed with the polyester after its polycondensation.

In general, the condensation of polyesters is carried out either by means of a dehydration condensation reaction between a hydroxy compound and a carboxylic acid having at least two functional groups, or by means of a condensation reaction between a hydroxy compound having at least two functional groups and a simple derivative of a dicarboxylic acid having at least two functional groups, e.g., a methyl ester or a glycol ester. Further, these condensation reactions are generally carried out by a two-stage reaction; namely, a first stage reaction which comprises heating a carboxylic acid having at least two functional groups, or a derivative thereof, and a hydroxy compound having at least two functional groups at a temperature in the neighborhood of the boiling point of the hydroxy compound to effect either the esterification or ester-interchange reaction to convert the carboxylic acid to a hydroxy compound ester, and a second stage reaction in which the polycondensation reaction is carried out by further heating said hydroxy compound ester at an elevated temperature under reduced pressure while removing the excess hydroxy compound. Further, the polycondensation reaction is either carried out under reduced pressure at a temperature above the melting point of the polyester to be formed or the polyester is shredded into suitable sizes and is carried out at a temperature below the melting point of the polyester either under reduced pressure or in a stream of inert gas such as nitrogen.

According to this invention, it is usually preferred that the aforesaid nitrogen-containing compounds be added in advance to the reaction materials or the reaction mixture either before the polycondensation reaction or during polymerization reaction for achieving an excellent stability and intimate blend. Alternatively, the nitrogen-containing compounds may be incorporated in the molten polyester at the time of the completion of the polycondensation reaction.

Needless to say, the conventional catalysts which are known to promote the esterification, ester-interchange and polycondensation reactions such, for example, as cobalt chloride, cobalt acetate, manganese acetate, calcium acetate, antimony oxide, alkyl titanates and compounds which inhibit the occurrence of discoloration during the reaction, for example, phosphoric acid, phosphorous acid, phosphoric esters and phosphorous esters may be added as usual during the several steps of the foregoing reactions.

The so obtained polyester composition containing the nitrogen-containing compound can then be made into the final product, a fiber or film, by extruding it in a molten state from a nozzle of a spinning machine or a slit of an extruder in accordance with customary procedures and thereafter drawing the freshly spun fiber or extruded film.

The polyester composition of this invention possess the desirable combination of the properties of excellent resistance to oxidation and resistance to dry as well as wet heat. Furthermore, no substantial discoloration is observed even at elevated temperatures. Namely, the invention polyester compositions demonstrate marked superiority over the unincorporated polyesters in the two properties of their stability to water and vapor up to about 150° C., i.e. resistance to wet heat, and stability to heat above 180° C., i.e. resistance to dry heat. For instance, substantially no change in the degree of polymerization takes place in the polyester compositions of this invention after heat treatment as compared with the degree of polymerization possessed prior to the treatment. Again, in the case of its drawn fibers, the rate of tenacity retention after dry and wet heat treatments, as compared with that possessed prior to treatment, was generally superior to that of the unincorporated polyesters and the polyester compositions containing the conventional stabilizers. The conventional polyester stabilizers are as yet not satisfactory as to the combination of the two properties of resistance to dry heat as well as resistance to wet heat. Hence, it is truly surprising to find that only the nitrogen-containing compounds chosen in this invention provided this desirable combination of the two properties.

In view of these superior properties, the fibers composed of the polyester compositions of this invention are not only useful for clothing purposes but also are valuable as materials for various industrial uses such as canvas for paper making, bagfilter, filter cloth for cement use, wrapping cloth, tire cord, material for electrical purposes, etc.

The following examples are given to illustrate this invention. Unless otherwise noted, the parts and percentages are on a weight basis.

EXAMPLE 1

(A) *Addition Method A.*—The ester-interchange reaction was carried out for 5 hours by heating at 150–230° C. 100 parts of dimethyl terephthalate, 70 parts of ethylene glycol and 0.09 part of calcium acetate while continuously distilling off the methanol formed to the outside of the system. This was followed by further adding 0.025 part of phosphorous acid, 0.03 part of antimony trioxide and the additive indicated in Table I in the amount prescribed, after which the polycondensation reaction was carried out by raising the temperature of the reaction mixture to 275° C. in one hour and maintaining this temperature for 4 hours under reduced pressure of 1 mm. Hg. The chips of the resulting polymer were spun and drawn, following which the fibers were subjected to a wet heat treatment and a dry heat treatment.

(B) *Addition Method B.*—Polyethylene terephthalate having an intrinsic viscosity in o-chlorophenol at 25° C. of 0.66 was obtained by reacting in customary manner 100 parts of dimethyl terephthalate, 70 parts of ethylene glycol, 0.09 part of calcium acetate, 0.03 part of antimony trioxide and 0.025 part of phosphorous acid. To the molten polyethylene terephthalate at 280° C. after completion of the reaction was added the additive indicated in Table I. After thorough mixing, spinning was carried out in customary manner followed by drawing the freshly spun filaments.

(C) *Addition Method C.*—Polyethylene terephthalate having an intrinsic viscosity of 0.66 was made into 2 x 2 x 4 mm. pellets, to which was then added the additive indicated in Table I. The mixture was mixed for one hour at 180° C. and thereafter spun and drawn in customary manner.

On the other hand, the vapor heat treatment and dry heat treatment were carried out in the following manner.

(a) *Wet Heat Treatment.*—The specimen yarn, after being wound onto an aluminium tube 4 cm. in diameter and set so as to ensure that it would not become relaxed, was placed in a vessel filled with water (pH=7.0), after which the vessel was closed. After placing this vessel in a 120° C. heater where it was held for the prescribed number of days, the yarn was taken out and its tenacity was measured and compared with that which it initially had before the treatment.

(b) *Dry Heat Treatment.*—The specimen yarn, after being strung with a given tension onto a rack and secured thereto, was heated for the prescribed number of hours in a constant temperature dryer of 230° C. It was measured and compared with that which it initially had before the treatment.

The tenacity retention rate was computed as follows:

$$\text{Tenacity retention rate} = \frac{\text{tenacity after treatment}}{\text{tenacity before treatment}} \times 100(\%)$$

The results obtained are shown in Table I, in which comparison is made with the instance wherein the invention additive was not incorporated and the instance wherein the conventional additives were incorporated.

TABLE I

| Additive | Method addition | Amount added, g | Wet Heat Treatment Tenacity Retention Rate | | | Dry Heat Treatment Tenacity Retention Rate | | | Remarks |
|---|---|---|---|---|---|---|---|---|---|
| | | | 3 days, percent | 5 days, percent | 15 days, percent | 1 hr., percent | 2 hr., percent | 3 hr., percent | |
| None | | | 0 | | | 66.5 | 54.3 | 47.8 | (1) |
| 2,2'-dimethyl-diphenylcarbodimide | A | 0.25 | 18.8 | | | 68.5 | 59.0 | 50.7 | (2) |
| Benzylphthalimide | A | 0.25 | 69.6 | 30.7 | 6.4 | 78.1 | 70.0 | 63.5 | |
| Acetylphthalimide | A | 0.25 | 55.1 | 22.4 | 0 | 74.3 | 67.6 | 60.1 | |
| p-Ethoxyacetanilide | A | 0.25 | 67.2 | 28.1 | 6.0 | 75.7 | 67.0 | 58.8 | |
| p-Ethoxydiacetanilide | A | 0.25 | 65.9 | 21.3 | 4.3 | 76.6 | 68.0 | 61.0 | |
| Phthalimide | A | 0.25 | 60.2 | 28.0 | 5.1 | 78.0 | 68.9 | 57.7 | |
| Terephthalic acid diamide | A | 0.25 | 58.7 | 20.8 | 4.0 | 77.1 | 69.3 | 60.2 | |
| Fumaric acid diamide | A | 0.25 | 60.3 | 19.4 | 3.3 | 75.5 | 66.2 | 59.8 | |
| N,N'-dimethylphthalhydrazide | A | 0.25 | 43.7 | 11.3 | 0 | 71.2 | 62.8 | 52.1 | |
| 2,3-dihydroxyquinoxaline | A | 0.25 | 41.3 | 12.0 | 0 | 70.7 | 60.0 | 51.8 | |
| 2,4,6-tristyrylpyridine | A | 0.25 | 47.1 | 14.4 | 2.3 | 72.3 | 61.9 | 52.3 | |
| Methyl p-(N,N'-dimethylamino)benzoate | A | 0.25 | 45.0 | 13.1 | 0 | 71.3 | 62.1 | 53.8 | |
| Hexamethylphosphorylamide | A | 0.25 | 52.7 | 16.8 | 0 | 74.3 | 65.0 | 56.7 | |
| Hexamethylphosphorousamide | A | 0.25 | 54.1 | 17.2 | 0 | 75.1 | 66.1 | 56.0 | |
| Triphenyl phosphite | A | 0.25 | 0 | | | 67.5 | 56.0 | 48.1 | (2) |
| Benzylphthalimide | A | 0.0009 | 25.5 | | | 68.2 | 58.4 | 48.0 | (3) |
| Do | A | 5.50 | 29.4 | | | 67.0 | 55.5 | 49.7 | (4) |
| Do | A | 2.00 | 52.2 | 14.3 | 0 | 74.0 | 65.9 | 57.8 | |
| Do | B | 0.25 | 68.1 | 25.3 | 2.0 | 71.2 | 63.3 | 55.1 | |
| p-Ethoxy acetanilide | B | 0.25 | 67.7 | 28.4 | 5.3 | 77.8 | 67.0 | 59.3 | |
| Benzylsuccinimide | B | 0.25 | 69.2 | 26.6 | 7.2 | 78.0 | 67.4 | 60.0 | |
| Hexamethylphosphorousamide | B | 0.25 | 56.0 | 16.9 | 4.4 | 73.2 | 64.7 | 58.1 | |
| Benzylphthalimide | C | 0.25 | 71.2 | 32.3 | 10.1 | 81.4 | 72.7 | 65.4 | |
| Acetylphthalimide | C | 0.25 | 66.7 | 27.3 | 6.6 | 78.4 | 69.0 | 61.5 | |
| p-Ethoxyacetanilide | C | 0.25 | 70.0 | 28.0 | 4.5 | 74.0 | 66.7 | 59.5 | |
| Fumaric acid diamide | C | 0.25 | 65.1 | 24.8 | 4.1 | 78.0 | 67.9 | 59.0 | |
| Benzylphthalimide and p-ethoxyacetanilide | A | 0.125 / 0.125 | 69.0 | 30.1 | 6.1 | 77.7 | 69.1 | 62.0 | (5) |
| Phenylnaphthalimide | A | 0.25 | 61.1 | 30.1 | 7.2 | 73.5 | 66.8 | 60.1 | |
| Methylnaphthalimide | A | 0.25 | 57.9 | 25.9 | 3.8 | 74.2 | 64.1 | 59.7 | |
| Acetylsuccinimide | A | 0.25 | 48.2 | 17.0 | 1.5 | 74.2 | 69.1 | 60.0 | |
| Phenylglutarimide | A | 0.25 | 52.1 | 21.8 | 3.6 | 74.3 | 65.1 | 57.6 | |
| 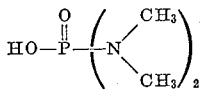 | A | 0.25 | 56.1 | 16.3 | 0 | 74.2 | 63.2 | 52.8 | |
| 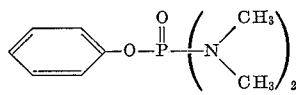 | A | 0.30 | 50.3 | 17.2 | 3.7 | 73.8 | 62.8 | 53.1 | |
| 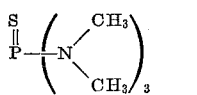 | A | 0.25 | 48.7 | 13.8 | 0 | 72.0 | 61.1 | 51.9 | |
| 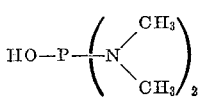 | A | 0.25 | 47.3 | 13.5 | 2.3 | 73.1 | 62.0 | 52.7 | |

TABLE I—Continued

| Additive | Method addition | Amount added, g | Wet Heat Treatment Tenacity Retention Rate | | | Dry Heat Treatment Tenacity Retention Rate | | | Remarks |
|---|---|---|---|---|---|---|---|---|---|
| | | | 3 days, percent | 5 days, percent | 15 days, percent | 1 hr., percent | 2 hr., percent | 3 hr., percent | |
| 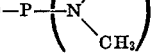 | A | 0.30 | 52.1 | 17.3 | 3.5 | 74.7 | 63.3 | 53.4 | |
| Quinoxaline 2,3-dicarboxylic acid | A | 0.25 | 46.3 | 11.3 | 0 | 72.1 | 62.9 | 53.8 | |
| Quinoxaloquinoxaline | A | 0.25 | 48.7 | 14.8 | 0 | 73.5 | 62.8 | 54.6 | |
| 2-hydroxyquinoxaline | A | 0.25 | 45.1 | 10.2 | 0 | 70.8 | 61.3 | 53.3 | |
| Malonic acid diamide | A | 0.25 | 59.3 | 20.0 | 4.0 | 75.4 | 65.5 | | |
| Phthalic acid diamide | A | 0.25 | 62.4 | 21.7 | 6.2 | 74.3 | 65.1 | | |
| Benzamide | A | 0.25 | 64.8 | 21.6 | 5.3 | 74.8 | 64.3 | | |
| Glycolic acid amide | A | 0.25 | 60.1 | 26.3 | 8.4 | 72.1 | 63.8 | | |
| 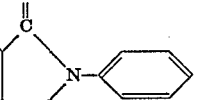 | A | 0.30 | 69.3 | 30.7 | 11.3 | 79.0 | 68.7 | 60.2 | |
| 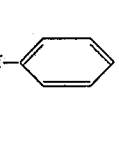 | A | 0.25 | 65.4 | 24.1 | 5.9 | 78.3 | 68.0 | 58.0 | |
| 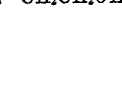 | A | 0.25 | 66.4 | 27.7 | 9.0 | 76.9 | 65.3 | 57.3 | |
|  | A | 0.25 | 70.7 | 31.2 | 10.2 | 79.5 | 69.1 | 59.7 | |
| 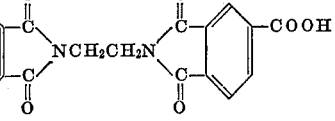 | A | 0.35 | 68.9 | 28.4 | 8.7 | 77.7 | 68.3 | 59.1 | |
| 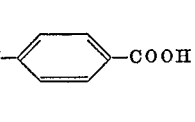 | A | 0.25 | 67.0 | 27.3 | 8.5 | 77.1 | 66.9 | 57.0 | |
|  | A | 0.25 | 43.2 | 13.5 | 4.5 | 73.5 | 64.2 | 55.1 | |
| 2,4-distyrylpyridine | A | 0.25 | 42.7 | 13.0 | 0 | 73.2 | 62.8 | 54.3 | |
| 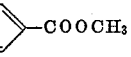 | A | 0.25 | 54.3 | 19.1 | 3.5 | 74.2 | 66.8 | 58.0 | |
| 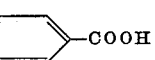 | A | 0.25 | 59.0 | 25.7 | 7.0 | 76.3 | 68.9 | 55.9 | |

TABLE I—Continued

| Additive | Method addition | Amount added, g | Wet Heat Treatment Tenacity Retention Rate | | | Dry Heat Treatment Tenacity Retention Rate | | | Remarks |
|---|---|---|---|---|---|---|---|---|---|
| | | | 3 days, percent | 5 days, percent | 15 days, percent | 1 hr., percent | 2 hr., percent | 3 hr., percent | |
| (structure: dimethylamino benzoate methyl ester, ortho) | A | 0.25 | 50.1 | 18.0 | 0 | 74.2 | 65.1 | 55.7 | |
| (structure: dimethylamino benzoate methyl ester, meta/para) | A | 0.25 | 61.3 | 21.0 | 8.4 | 78.9 | 69.1 | 59.8 | |
| (structure: bis-dimethylamino benzoate methyl ester) | A | 0.30 | 62.4 | 21.7 | 5.7 | 78.0 | 67.5 | 59.0 | |
| $NH_2-C_6H_4-COOCH_2CH_2OH$ | A | 0.20 | 51.2 | 17.3 | 5.5 | 75.8 | 66.4 | 55.0 | |
| $HOOC-C_6H_4-CONH_2$ | A | 0.30 | 54.8 | 19.7 | 5.1 | 73.7 | 63.4 | 54.7 | |
| $CH_3OOC-C_6H_4-CON(CH_3)_2$ | A | 0.25 | 50.7 | 15.4 | 0 | 71.7 | 62.6 | 53.7 | |
| (structure: benzene with -COOH and -CONH₂) | A | 0.30 | 55.8 | 20.3 | 7.8 | 77.0 | 64.3 | 54.9 | |
| (structure: benzene with -COOCH₃ and -CONHCH₃) | | | | | | | | | |
| $HOOC(CH_2)_4CONH_2$ | A | 0.20 | 56.3 | 21.8 | 7.4 | 78.5 | 68.2 | 57.5 | |

1 Blank.
2 Known example.
3 Outside the scope of the claim of the invention.
4 (pronounced discoloration).
5 Example of conjoint use of 2 classes of additives.

EXAMPLE 2

(A) A 3-necked flask equipped with a stirrer, a thermometer and a packed rectifying column was charged with 100 grams of dimethyl terephthalate, 75 grams of ethylene glycol, 0.03 gram of cobalt chloride and 0.02 gram of calcium acetate, after which the ester interchange reaction was carried out by heating the mixture with stirring.

The methanol formed was eliminated to the outside of the system via the rectifying column. When the theoretical amount of methanol was distilled off, the reaction mixture was transferred to a test tube with side arm and, after adding thereto a normal amount of antimony oxide and triphenyl phosphate, the polycondensation reaction was carried out for 2 hours at 270–280° C. under reduced pressure of 0.1–0.5 mm. Hg. The so obtained polymer had a softening point of 261.3° C. and an inherent viscosity as measured in o-chlorophenol and a degree of coloration of respectively 0.605 and 10 (a Hazen number obtained by comparison with the standard Hazen solution).

When, after comminution and thorough drying, the relative viscosity of this polymer was measured as a 1% solution in a trifluoroacetic acid-chloroform solvent mixture, it was 1.764. When this comminuted polymer was allowed to stand in air at 230° C. and its viscosity was again determined, it was 1.349.

(B) A polyethylene terephthalate composition was obtained operating as hereinbefore described in A, except that prior to carrying out the ester interchange reaction 0.5 gram of a compound indicated in Table II, below, was added.

The inherent viscosity in o-chlorophenol, the degree of coloration and the relative viscosities in the trifluoroacetic acid-chloroform solvent mixture of the comminuted polymer before and after a one hour heat treatment at 230° C. are shown in Table II.

TABLE II

| Amine Added | Intrinsic Viscosity | Hazen No. | Relative Viscosity | |
|---|---|---|---|---|
| | | | Before Heat Treatment | After Heat Treatment |
| Methyl p-(N,N-dimethylamine)benzoate | 0.727 | 20 | 1.722 | 1.720 |
| Methyl N,N-dimethylanthranilate | 0.635 | 10 | 1.751 | 1.747 |
| Anthranilic acid | 0.612 | 40 | 1.730 | 1.737 |
| Methyl 3,5-diamino benzoate | 0.664 | 60 | 1.783 | 1.776 |
| Methyl 3,5-di(N,N,N',N-tetramethylamine)benzoate | 0.697 | 20 | 1.779 | 1.780 |

EXAMPLE 3

After suspending 100 grams of terephthalic acid in 1000 ml. of water, 10 mol percent of magnesium oxide were added thereto, following which ethylene oxide was blown in while heating the mixture at 90° C. with stirring. After a reaction period of 8 hours, the solution was cooled to precipitate crystals, which were filtered and well dried. Then antimony oxide and triphenyl phosphate in normal amounts and 0.5% of hydroxyethyl p-(N,N-dimethylamino)benzoate were added and the polymerization reaction was carried out for 2 hours at 270–280° C. The resulting colorless, transparent polymer had a softening point of 261° C. and its Hazen number measured as an o-chlorophenol solution was 10. After comminution and a thorough drying of this polymer, its relative viscosity as measured in a trifluoroacetic acid-chloroform solvent mixture was 1.771. On the other hand, the viscosity after heat treatment for one hour in air at 230° C. was 1.770. By way of reference, the relative viscosities before and after heat treatment in the case of the polymer polymerized without the addition of the hydroxyethyl p-(N,N-dimethylamino)benzoate were 1.779 and 1.540, respectively.

EXAMPLE 4

To a mixture of 100 grams of dimethyl terephthalate, 75 grams of ethylene glycol, 0.03 gram of cobalt chloride and 0.02 gram of calcium acetate was added 0.1 gram of methyl terephthalamate, following which the ester interchange reaction was carried out as in Example 2A. After the theoretical amount of methanol had distilled off, the reaction mixture was transferred to a test tube with a side arm, to which were added antimony oxide and triphenyl phosphate in normal amounts, following which the polycondensation reaction was carried out for 2 hours at 270–280° C. after the degree of reduced pressure had reached 0.1–0.5 mm. Hg. The resulting polymer had a softening point of 262.8° C., and its inherent viscosity and degree of coloration measured as an o-chlorophenyl solution were 0.625 and 30, respectively.

Next, as in Example 2A, the polymer was comminuted and dried and then allowed to stand for one hour in air at 230° C. The relative viscosities of the polymer in a trifluoroacetic acid-chloroform solvent mixture immediately after drying and after the 230° C. heat treatment were 1.608 and 1.605, respectively, demonstrating no drop in viscosity.

EXAMPLE 5

Antimony oxide and triphenyl phosphate in normal amounts, along with methyl N,N-dimethylterephthalamate were added to a glycol ester of terephthalic acid which was ester interchanged as in Example 2A, after which the polymerization reaction was carried out for 2 hours at 270–280° C. under reduced pressure of 0.1–0.5 comminuted as in Example 2A and then heat treated for one hour at 230° C. The relative viscosities before and after the heat treatment are shown in Table III.

TABLE III

|  | Relative Viscosity | |
|---|---|---|
|  | Before Heat Treatment | After Heat Treatment |
| Amount added wt. percent: | | |
| 5 | 1.307 | 1.293 |
| 2 | 1.454 | 1.450 |
| 0.5 | 1.760 | 1.762 |
| 0.1 | 1.758 | 1.749 |
| 0.01 | 1.764 | 1.750 |

EXAMPLE 6

One hundred grams of terephthalic acid were suspended in 1000 ml. of water, to which were added 10 mol percent of magnesium oxide followed by blowing in ethylene oxide while heating the mixture at 90° C. with stirring. After a reaction period of 8 hours, the solution was cooled to precipitate crystals which were filtered and well dried. This was followed by adding to the crystals in normal amounts antimony oxide and triphenyl phosphate along with 0.5% of adipic acid monoamidohydroxyethyl ester, the polymerization reaction then being carried out for 2 hours at 270–280° C. and reduced pressure of 0.1–0.5 mm. Hg. The resulting polymer was colorless and transparent, and it had a softening point of 261° C. and a Hazen number of 10, measured as an o-chlorophenol solution. The relative viscosity of this polymer as measured in a trifluoroacetic acid-chloroform solvent mixture after comminution and thorough drying of the polymer was 1.771. Again, the viscosity after heat treatment for one hour in air at 230° C. was 1.770. By way of reference, the relative viscosities before and after heat treatment of a polymer polymerized without adding the adipic acid monoamidohydroxyethyl ester were 1.779 and 1.540, respectively.

EXAMPLE 7

A mixture of 80 grams of terephthalic acid, 180 grams of ethylene glycol and 0.05 gram of N-methyl, N-benzylterephthalamic acid, to which had been added in normal amounts cobalt chloride, antimony oxide and triphenyl phosphate was placed in a 3-necked flask equipped as in Example 2A, with a stirrer, a thermometer and a rectifying column, after which the mixture was heated with stirring. The water formed was eliminated to the outside of the system via the rectifying column, and when the theoretical amount of water had been distilled off, the reaction mixture was transferred to a flask with a side arm where it was polycondensed at 270–280° C. at reduced pressure of 0.1–0.5 mm. Hg. The resulting polymer had a softening point of 261.3° C. This polymer was comminuted, thoroughly dried and then allowed to stand for one hour in air at 200° C. When the relative viscosities of the polymer in a trifluoroacetic acid-chloroform solvent mixture before and after the heat treatment were measured, they were 1.658 and 1.655, respectively.

EXAMPLE 8

After adding 0.5 gram of malonic acid diphenylamide to a mixture of 100 grams of dimethyl terephthalate, 75 grams of ethylene glycol, 0.03 gram of cobalt chloride and 0.02 gram of calcium acetate, the ester interchange reaction was carried out as in Example 2A. After the theoretical amount of methanol had distilled off, the mixture was transferred to a test tube with side arm. Antimony oxide and triphenyl phosphate were added in normal amounts to the mixture, following which the polycondensation reaction was carried out for 2 hours at 270–280° C. after the degree of reduced pressure had reached 0.1–0.5 mm. Hg. The resulting polymer had a softening point of 262° C. and its inherent viscosity and degree of coloration measured as an o-chlorophenol solution were 0.604 and 20, respectively.

The polymer was then comminuted and dried followed by standing for one hour in air at 230° C., as in Example 2A. The relative viscosities in a trifluoroacetic acid-chloroform solvent mixture immediately after drying and after heat treatment at 230° C. were 1.722 and 1.720, respectively, thus demonstrating no decline in viscosity.

EXAMPLE 9

The ester interchange reaction was carried out as in Example 8, adding 0.5% of a compound indicated in Table IV. This was followed by adding in normal amounts antimony oxide and triphenyl phosphate, after which the mixture was subjected to the polmerization reaction. The inherent viscosity and degree of coloration of the resulting polymer in o-chlorophenol and the relative viscosities of the comminuted polymer in a trifluoroacetic acid-chloroform solvent mixture before and after heat treatment for one hour at 230° C. are shown in Table IV,

TABLE IV

| Amine added | Inherent Viscosity | Hazen No. | Relative Viscosity Before Heat Treatment | Relative Viscosity After Heat Treatment |
|---|---|---|---|---|
| Glycolic acid amide | 0.598 | 20 | 1.725 | 1.726 |
| Terephthalic acid amide | 0.653 | 10 | 1.765 | 1.762 |
| p-Toluic acid amide | 0.612 | 20 | 1.730 | 1.737 |
| Fumaric acid amide | 0.654 | 40 | 1.765 | 1.766 |
| Phenacetin | 0.705 | 20 | 1.789 | 1.788 |

EXAMPLE 10

(A) One hundred grams of dimethyl terephthalate, 75 grams of ethylene glycol and 0.009 gram of calcium acetate were charged to a 3-necked flash equipped with a stirrer, a thermometer and packed rectifying column, after which the ester interchange reaction was carried out by heating the mixture with stirring.

The methanol formed was eliminated to the outside of the system via the rectifying column. When the theoretical amount of methanol had been distilled off, the reaction mixture was transferred to a flask with side arm and, after adding in normal amounts antimony oxide and trimethyl phosphate, the polymerization at 270–280° C. and reduced pressure of 0.1–0.5 mm. Hg. The resulting polymer was colorless and transparent and had a softening point of 261.4° C. and an inherent viscosity as measured in o-chlorophenol of 0.645.

When this polymer was comminuted and thoroughly dried, and then measured for its relative viscosity as a 1% solution in a trifluoroacetic acid-chloroform solvent mixture, it was 1.775.

Next, this comminuted polymer was heat treated by standing for one hour in air at 230° C. When the relative viscosity was then measured, it was 1.358. If this is converted to degree of polymerization, this denotes a decrease thereof by about one half. Thus, it can be seen that the polymer had been subjected to a very great oxidative or thermal decomposition as a result of having been heated for one hour at 230° C.

(B) The ester interchange reaction was carried out by changing a 3-necked flask, as used in A, above, with 100 grams of dimethyl terephthalate, 75 grams of ethylene glycol, 0.09 gram of a calcium acetate and 0.1 gram of phthalhydrazide. When the theoretical amount of methanol had distilled off, the reaction mixture was transferred to a flask with a side arm where it was polymerized for 2 hours at 270–280° C. and reduced pressure of 0.1–0.5 mm. Hg after adding in normal amounts antimony oxide and trimethyl phosphate. The resulting polymer had a softening point of 260.8° C. and was very slightly yellow and transparent, while its Hazen number, when measured as an o-chlorophenol solution, was 30.

This polymer was comminuted, dried and heat treated as in A, above. The relative viscosities in a trifluoroacetic acid-chloroform solvent mixture of this polymer (1% concentration) before and after the heat treatment were 1.781 and 1.778, respectively. Thus, no decline in the degree of polymerization was noted.

EXAMPLE 11

One hundred grams of dimethyl terephthalate, 75 grams of ethylene glycol, 0.03 gram of cobalt chloride, 0.02 gram of calcium acetate and 0.01 gram of 2,6-distyrylpyridine were charged to a 3-necked flask, as employed in Example 2A, and the ester interchange reaction was carried out by heating the mixture with stirring. When the theoretical amount of methanol had distilled off, the reaction mixture was transferred to a flask with side arm. After adding thereto in normal amounts antimony oxide and trimethyl phosphate, the polycondensation reaction was carried out at 270–280° C. under reduced pressure of 0.1–0.5 mm. Hg.

The resulting polymer was transparent and practically colorless having only a slight yellowish tinge. Its softening point was 261.7° C. and its inherent viscosity measured as an o-chlorophenol solution was 0.623. As in Example 2A, this polymer was comminuted, thoroughly dried and then heat treated by allowing it to stand for one hour in air at 230° C. When the relative viscosities of this polymer dissolved in a trifluoroacetic acid-chloroform solvent mixture were measured before and after the heat treatment, they were 1.799 and 1.770, respectively. It can thus be seen that the polymer had not been subjected to oxidative or thermal decomposition even though it was heat treated for one hour at 230° C.

When, for information, the terminal carboxyl groups of the polymer were measured before and after the heat treatment, they were respectively 21 and 24 eq./$10^6$ g.

EXAMPLE 12

To a mixture of 80 grams of terephthalic acid and 180 grams of ethylene glycol were added in the normal amounts of Example 2A cobalt chloride, antimony oxide and trimethyl phosphate and 0.008 gram of 2-styryl-4-ethylpyridine. The mixture was then charged to a 3-necked flask, as used in Example 2A, and esterified by heating with stirring. The water formed was eliminated to the outside of the system via the rectifying column. When the theoretical amount of water had been distilled off, the reaction mixture was transferred to a flask with a side arm and polycondensed therein for 2 hours at 270–280° C. under reduced pressure of 0.1–0.5 mm. Hg. The resulting polymer was light blue and transparent and had a softening point of 261.4° C. This polymer was comminuted, dried and heat treated as in Example 2A, and the viscosities of polymer before and after heat treatment were measured. When the degrees of polymerization were calculated from these measurements, no decline in the degree of polymerization was observed with a heat treatment of one hour at 230° C.

EXAMPLE 13

One hundred grams of dimethyl terephthalate, 75 grams of ethylene glycol and 0.09 gram of calcium acetate were charged to a 3-necked flask, as used in Example 2A, and the ester interchange reaction was carried out. After the theoretical amount of methanol had been distilled off, the reaction mixture was transferred to a flask with a side arm and antimony oxide in a normal amount along with 0.1 gram of phosphoryltriamide was added, after which the polycondensation reaction was carried out. The excess ethylene glycol was distilled off at 270–280° C., and the polymerization was continued by heating for 2 hours under reduced pressure of 0.1–0.5 mm. Hg. The resulting polymer was transparent and slightly tinged with yellow. Its softening point was 262° C. and its inherent viscosity as measured in o-chlorophenol was 0.642.

The decline in the degree of polymerization of the polymer after heat treatment at 230° C. in air was determined as in Example 2A, but the relative viscosities in a solvent as used in Example 2A were 1.772 and 1.769 while the terminal carboxyl group was also 21 and 29 eq./$10^6$g. Thus, no decline in the degree of polymerization was noted.

EXAMPLE 14

To a mixture of 80 grams of terephthalic acid and 180 grams of ethylene glycol were added cobalt chloride and antimony acid in normal amounts and 0.1 gram of N,N′,N″-triphenylphosphorylamide, after which the mixture was charged to a 3-necked flask, as used in Example 2A, and heated therein with stirring. The water formed was eliminated to the outside of the system via the rectifying tower. After the theoretical amount of water had been distilled off, the reaction mixture was transferred to a flask with a side arm. The temperature was raised to 270–280° C. and the excess ethylene glycol was driven out, after which the polycondensation reaction was continued for 2 hours at reduced pressure of 0.1–0.5 mm. Hg. The resulting polymer was light blue and transparent and its softening point was 259.4° C.

When its thermal stablity was tested by heat treating it in air at 230° C. as in Example 2A, no decline in viscosity was noted.

EXAMPLE 15

Terephthalic acid glycol ester was synthesized from 100 grams of dimethyl terephthalate, 75 grams of ethylene glycol and 0.09 gram of calcium acetate by carrying out the ester interchange reaction as in Example 2A, and 0.2 gram of N-methylphosphorousamide were added to this glycol ester and the mixture was polycondensed. The resulting polymer was colorless and transparent and had a softening point of 262.1° C. When the thermal stability of this polymer was tested as in Example 2A, it was satisfactory.

EXAMPLE 16

One hundred grams of dimethyl terephthalate, 75 grams of ethylene glycol, 0.09 gram of calcium acetate and 0.05 gram of 2,3-dichloroquinoxaline were charged to a 3-necked flask, as used in Example 2A, and the ester interchange reaction was carried out. After the theoretical amount of methanol had distilled off, the reaction mixture was transferred to a flask with a side arm and, after addition in normal amounts of antimony oxide and trimethyl phosphate, the polycondensation reaction was carried out.

The resulting polymer, which was transparent and exhibited a slightly yellowish tinge, had a softening point of 260.8° C. When the relative viscosities before and after heat treatment for one hour at 230° C. were determined as in Example 2A, they were 1.744 and 1.736, respectively. Thus, no decline in viscosity was noted.

EXAMPLE 17

One hundred grams of dimethyl terephthalate, 75 grams of ethylene glycol and 0.09 gram of calcium acetate were placed in a 3-necked flask, as used in Example 2A, and the ester interchanged reaction was carried out. After the theoretical amount of methanol had distilled off, the reaction mixture was transferred to a flask with a side arm. 0.01 gram of quinoxaloquinoxaline and antimony oxide and trimethyl phosphate in normal amounts were then added to the reaction mixture, after which the polycondensation reaction was carried out under reduced pressure. A period of time longer than that in the case of Example 2A was used for attaining the reduced pressure of 0.01–0.5 mm. Hg. The resulting polymer was transparent but with a slightly reddish tinge. The heat treatment of this polymer was carried out as in Example 2A, but no decline in the degree of polymerization from the before-heat treatment value was noted after the heat treatment.

EXAMPLE 18

Except that 10 parts of dimethyl isophthalate were further added to the 100 parts of dimethyl terephthalate in Example 1A, the copolycondensation reaction was otherwise carried out a therein described. In this case, the additive indicated in Table V in an amount as prescribed therein was added. This polymer was spun and drawn in customary manner and thereafter subjected to vapor and dry heat treatments, with the result shown in Table V.

TABLE V

| Additive | Addition method | Amount added wt. percent | Wet Heat Treatment Tenacity Retention Rate | | | Dry Heat Treatment Tenacity Retention Rate | | |
|---|---|---|---|---|---|---|---|---|
| | | | 3 days, percent | 5 days, percent | 15 days, percent | 1 hr., percent | 2 hr., percent | 3 hr. percent |
| Not added | | | 0 | | | 41.0 | 32.5 | 24.7 |
| Benzylphthalimide | A | 0.25 | 47.2 | 19.5 | 0 | 62.0 | 51.1 | 40.7 |
| Phenyltrimellitimide | A | 0.25 | 43.5 | 14.9 | 0 | 59.3 | 48.3 | 37.9 |
| Phenacetin | A | 0.25 | 40.6 | 11.0 | 0 | 57.8 | 47.5 | 37.0 |

We claim:
1. A stabilized polyester composition comprising a polyester selected from the group consisting of polyethylene terephthalate and modified polyesters comprised of at least 60% of ethylene terephthalate units and the rest of other ester units, and 0.001 to 5 percent by weight, based on said polyester, of a nitrogen-containing compound selected from the group consisting of
(I) compounds of the formula

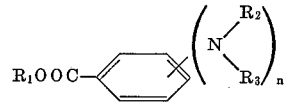

wherein $R_1$ is a member selected from the group consisting of hydrogen, hydrocarbon groups of 1 to 10 carbon atoms and hydroxy lower alkyl, each of $R_2$ and $R_3$ is a member selected from the group consisting of hydrogen, hydrocarbon groups of 1–10 carbon atoms, and $n$ is an integer from 1 to 2;
(II) compounds of the formula

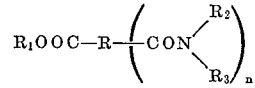

wherein $R_1$, $R_2$, $R_3$ and $n$ have the meanings hereinbefore defined, and R is a di- or trivalent hydrocarbon group of 1 to 10 carbon atoms;
(III) compounds of the formula

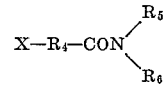

wherein $R_4$ is a divalent hydrocarbon group of 1 to 10 carbon atoms, each of $R_5$ and $R_6$ is a member selected from the group consisting of hydrogen, hydrocarbon groups of 1 to 10 carbon atoms and lower alkoxyaryl, and X is a member selected from the group consisting of hydrogen, hydroxyl and group

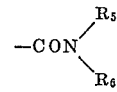

(IV) compounds of the formula

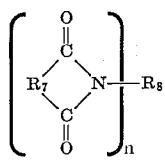

wherein $R_7$ is a member selected from the group consisting of alkylene groups of 2 to 5 carbon atoms, and 1,2-phenylene group, whose nucleus may be substituted with a substituent group selected from the class lower alkyl, halogen, carboxyl, alkoxycarbonyl, and hydroxyalkoxycarbonyl, $R_8$ is a member selected from the group consisting of hydrogen and hydrocarbon groups of 1–20 carbon atoms, which may have a substituent group of the class consisting of carboxyl, hydroxyl, alkoxycarbonyl and hydroxyalkoxy carbonyl, and an acyl group, and $n$ is an integer from 1 to 2, with the proviso that when $R_7$ is said alkylene chain the two carbonyl groups are attached to different carbon atoms of the alkylene group and when $n$ is 2 $R_8$ is a divalent hydrocarbon groups;

(V) compounds of the formula

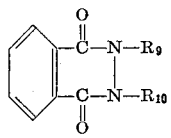

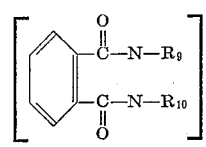

wherein each of $R_9$ and $R_{10}$ is a member selected from the group consisting of hydrogen, phenyl and lower alkyl groups;

(VI) compounds of the formula

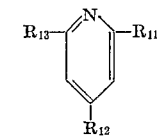

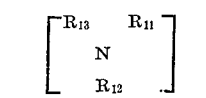

wherein each of $R_{11}$, $R_{12}$ and $R_{13}$ is a member selected from the group consisting of hydrogen and hydrocarbon groups of 1–10 carbon atoms, with the proviso that at least two of the group are hydrocarbon;

(VII) compounds of the formula

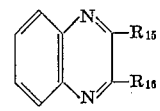

wherein each of $R_{15}$ and $R_{16}$ is a member selected from the group consisting of hydrogen, hydroxyl, carboxyl and halogens, or $R_{15}$ and $R_{16}$ may be linked to form the group

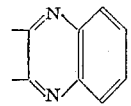

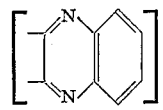

2. A composition according to claim 1 wherein said nitrogen-containing compound has been incorporated in the polyester during the stage prior to the completion of the polycondensation of the polyester.

3. A composition according to claim 1 wherein said nitrogen-containing compound has been incorporated in the molten polyester at the time of completion of the polycondensation reaction.

4. A composition according to claim 1 wherein said nitrogen-containing compound is benzylphthalimide.

5. A composition according to claim 1 wherein said nitrogen-containing compound is phenyltrimellitimide.

6. A composition according to claim 1 wherein said nitrogen-containing compound is phenacetin.

7. A composition according to claim 1 wherein said nitrogen-containing compound is terephthaldiamide.

8. A composition according to claim 1 wherein said nitrogen-containing compound is beta-carboxyethylphthalimide.

9. A fiber composed of the composition of claim 1.

10. A film composed of the composition of claim 1.

References Cited

UNITED STATES PATENTS

| | | | |
|---|---|---|---|
| 2,322,938 | 6/1943 | Howard | 260—75 |
| 2,996,477 | 8/1961 | Long et al. | 260—45.9 |
| 3,100,197 | 8/1963 | Heuck et al. | 260—45.9 |
| 3,224,889 | 12/1965 | Schulde et al. | 106—177 |
| 3,308,095 | 3/1967 | Maerov | 260—47 |
| 3,340,225 | 9/1967 | Dressler et al. | 260—45.8 |
| 3,388,159 | 6/1968 | Sayigh et al. | 260—556 |

DONALD E. CZAJA, Primary Examiner

R. A. WHITE, Assistant Examiner

U.S. Cl. X.R.

260—45.85, 45.9

UNITED STATES PATENT OFFICE
CERTIFICATE OF CORRECTION

Patent No. 3,491,057                                            January 20, 1970

Tadao Kato et al.

It is certified that error appears in the above identified patent and that said Letters Patent are hereby corrected as shown below:

Column 5, line 9, in the fifth formula, cancel the final subscript "2" and insert therefor the subscript -- 3 --; lines 48 to 51, insert the following formula:

Signed and sealed this 17th day of November 1970.

(SEAL)
Attest:

EDWARD M. FLETCHER, JR.                          WILLIAM E. SCHUYLER, JR.
Attesting Officer                                   Commissioner of Patents